US012687803B2

(12) United States Patent
Yamada et al.

(10) Patent No.: US 12,687,803 B2
(45) Date of Patent: Jul. 21, 2026

(54) IMAGE FORMING DEVICE AND IMAGE FORMING METHOD PROVIDING NOTIFICATIONS FOR PRESSURE CONTACT FORCE ADJUSTMENTS

(71) Applicant: SHARP KABUSHIKI KAISHA, Sakai City (JP)

(72) Inventors: Nobuyasu Yamada, Sakai City (JP); Atsushi Ogo, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/980,034

(22) Filed: Dec. 13, 2024

(65) Prior Publication Data

US 2025/0208544 A1 Jun. 26, 2025

(30) Foreign Application Priority Data

Dec. 25, 2023 (JP) ................................ 2023-218524

(51) Int. Cl.
*G03G 15/00* (2006.01)
*G03G 15/20* (2006.01)

(52) U.S. Cl.
CPC ..... *G03G 15/2035* (2013.01); *G03G 15/2064* (2013.01); *G03G 15/5012* (2013.01); *G03G 15/5016* (2013.01); *G03G 15/6588* (2013.01); *G03G 2215/00514* (2013.01); *G03G 2215/00548* (2013.01)

(58) Field of Classification Search
CPC ........... G03G 15/2032; G03G 15/2035; G03G 15/2064; G03G 15/5016; G03G 15/5012; G03G 15/5079; G03G 15/70; G03G 15/6588; G03G 15/6591; G03G 2215/00514; G03G 2215/00548
USPC ...................................... 399/21, 45, 81, 328
See application file for complete search history.

(56) References Cited

U.S. PATENT DOCUMENTS

2009/0297181 A1* 12/2009 Yamanaka ......... G03G 15/2032 399/33
2012/0107000 A1* 5/2012 Udagawa ........... G03G 15/2032 399/67
2012/0114353 A1* 5/2012 Watanabe .......... G03G 15/5012 399/67

(Continued)

FOREIGN PATENT DOCUMENTS

JP 2021-086116 A 6/2021

*Primary Examiner* — Robert B Beatty
(74) *Attorney, Agent, or Firm* — ScienBiziP, P.C.

(57) ABSTRACT

An image forming device includes a toner image former forming, on a paper sheet, a toner image based on image information; a fixer including at least a pair of rollers and fixing the toner image by nipping, with a pressing member formed by the pair of rollers, the paper sheet on which the toner image is formed; an adjuster adjusting a pressure contact force applied by the pressing member to either a first pressure contact force or a second pressure contact force that is weaker than the first pressure contact force; and a controller controlling execution of a job related to image formation via the fixer, in which the controller provides a user with a notification that prompts the user to operate the adjuster for adjusting the pressure contact force to either the first pressure contact force or the second pressure contact force in accordance with the previously executed job.

12 Claims, 16 Drawing Sheets

5791

| | JOB TYPE | PAPER TYPE | PRESSURE CONTACT FORCE | LEVER POSITION | ACKNOWLEDGMENT MESSAGE |
|---|---|---|---|---|---|
| PRINT JOB | TYPE A | REGULAR PAPER | FIRST PRESSURE CONTACT FORCE_FIXATION PRESSURE CONTACT | PRESSURE CONTACT POSITION | ACKNOWLEDGMENT MESSAGE A |
| | TYPE B | ENVELOPE | SECOND PRESSURE CONTACT FORCE_RELEASE OF FIXATION PRESSURE | PRESSURE CONTACT RELEASE POSITION | ACKNOWLEDGMENT MESSAGE B |

(56) References Cited

U.S. PATENT DOCUMENTS

| | | | | |
|---|---|---|---|---|
| 2016/0378031 | A1* | 12/2016 | Takahashi .......... | G03G 15/2053 399/329 |
| 2018/0017911 | A1* | 1/2018 | Watanabe .......... | G03G 15/2042 |
| 2019/0332043 | A1* | 10/2019 | Nakabo .............. | G03G 15/2032 |
| 2023/0367247 | A1* | 11/2023 | Harashima ......... | G03G 15/2064 |

* cited by examiner

FIG. 4

5791

| | JOB TYPE | PAPER TYPE | PRESSURE CONTACT FORCE | LEVER POSITION | ACKNOWLEDGMENT MESSAGE |
|---|---|---|---|---|---|
| PRINT JOB | TYPE A | REGULAR PAPER | FIRST PRESSURE CONTACT FORCE_FIXATION PRESSURE CONTACT | PRESSURE CONTACT POSITION | ACKNOWLEDGMENT MESSAGE A |
| | TYPE B | ENVELOPE | SECOND PRESSURE CONTACT FORCE_RELEASE OF FIXATION PRESSURE | PRESSURE CONTACT RELEASE POSITION | ACKNOWLEDGMENT MESSAGE B |

"LOWER BOTH OPERATION LEVERS SIMULTANEOUSLY. REMOVE JAMMED PAPER."

"MOVE PAPER SLOWLY IN DIRECTION OF ARROW TO KEEP PAPER FROM TEARING. ENSURE NO PAPER FRAGMENTS ARE LEFT."

"RETURN BOTH OPERATION LEVERS TO RESPECTIVE ORIGINAL POSITIONS SIMULTANEOUSLY."

"LOWER BOTH OPERATION LEVERS SIMULTANEOUSLY. REMOVE JAMMED PAPER."

"MOVE PAPER SLOWLY IN DIRECTION OF ARROW TO KEEP PAPER FROM TEARING. ENSURE NO PAPER FRAGMENTS ARE LEFT."

IMAGE FORMING DEVICE AND IMAGE FORMING METHOD PROVIDING NOTIFICATIONS FOR PRESSURE CONTACT FORCE ADJUSTMENTS

BACKGROUND OF THE INVENTION

Field of the Invention

The present disclosure relates to an image forming device and the like.

Description of the Background Art

Some image forming devices employing an electrophotographic method, such as printers and multifunction machines, fix a toner image by nipping a paper sheet on which the toner image is formed with a pressing member (also referred to as a nipper) of a fixer.

For example, prior art describes an image forming device in which the nipping pressure of a fixing nipper can be manually changed, and the nipping pressure can be changed according to the type of paper.

The purpose of the present disclosure is to provide an image forming device and the like capable of preventing a malfunction due to a forgotten operation or an erroneous operation even when an event involving a change in pressure contact force in a fixer occurs.

SUMMARY OF THE INVENTION

In order to solve the above problem, an image forming device according to the present disclosure includes a toner image former that forms, on a paper sheet, a toner image based on image information; a fixer that includes at least a pair of rollers and fixes the toner image by nipping, with a pressing member formed by the pair of rollers, the paper sheet on which the toner image is formed; an adjuster that adjusts a pressure contact force applied by the pressing member to either a first pressure contact force or a second pressure contact force that is weaker than the first pressure contact force; and a controller that controls execution of a job related to image formation via the fixer, in which the controller provides a user with a notification that prompts the user to operate the adjuster for adjusting the pressure contact force to either the first pressure contact force or the second pressure contact force in accordance with the job previously executed.

In addition, an image forming method according to the present disclosure includes forming, on a paper sheet, a toner image based on image information, and fixing the toner image by nipping, with a pressing member formed by a pair of rollers, the paper sheet on which the toner image is formed, in which a pressure contact force applied by the pressing member is adjusted to either a first pressure contact force or a second pressure contact force that is weaker than the first pressure contact force by operating an adjuster, and a user is provided with a notification that prompts the user to operate the adjuster for adjusting the pressure contact force to either the first pressure contact force or the second pressure contact force in accordance with a job previously executed.

According to the present disclosure, it is possible to provide an image forming device and the like capable of preventing a malfunction due to a forgotten operation or an erroneous operation even when an event involving a change in pressure contact force in a fixer occurs.

BRIEF DESCRIPTION OF THE DRAWINGS

FIG. 4 is a diagram illustrating a determination table according to the first embodiment.

DESCRIPTION OF THE PREFERRED EMBODIMENTS

Hereinafter, embodiments of the present disclosure will be described with reference to drawings. In the present disclosure, for example, a multifunction machine capable of realizing jobs related to copying, faxing, e-mailing, and the like in one casing will be described as one form of an image forming device. In the present disclosure, a configuration of a fixer that includes at least a pair of rollers composed of a pressurizing roller and a heat roller and fixes a toner image by nipping, with a pressing member formed by the pair of rollers, a paper sheet on which the toner image is formed will be described. However, the pressing member can also be configured via a pad with a fixing belt interposed therebetween instead of the heat roller. Note that the following embodiments are examples for describing the present disclosure, and the technical content of the description described in the claims is not limited to the following description.

In an image forming device which includes a mechanism manually operating pressure contact and release of pressure contact with the pair of rollers constituting the fixer and which includes no function to automatically detect release of pressure contact, for example, when printing is performed on a paper sheet having a sheet thickness thicker than that of regular paper, such as an envelope, or when an event requiring operation for releasing pressure contact, such as clearance of a paper jam occurs, a user is required to grasp operation specifications and make a self-judgment.

For this reason, in the image forming device having such a configuration, a forgotten operation and an erroneous operation are easily caused by a user, and an image forming (printing) operation performed in an erroneous state causes poor image quality or causes a paper jam to recur.

In the present disclosure, by providing a user with a notification that prompts the user to operate an adjuster for adjusting a pressure contact force in the fixer to either a first pressure contact force or a second pressure contact force in accordance with a job previously executed, an image forming device and the like capable of preventing a malfunction due to a forgotten operation or an erroneous operation even when an event involving a change in the pressure contact force in the fixer occurs are embodied in the following embodiments.

1. First Embodiment

In a first embodiment, when a print job involving a change in paper type is executed, a user is provided with a notification that prompts the user to operate an adjuster.

1.1. Overall Configuration

Figure 1:
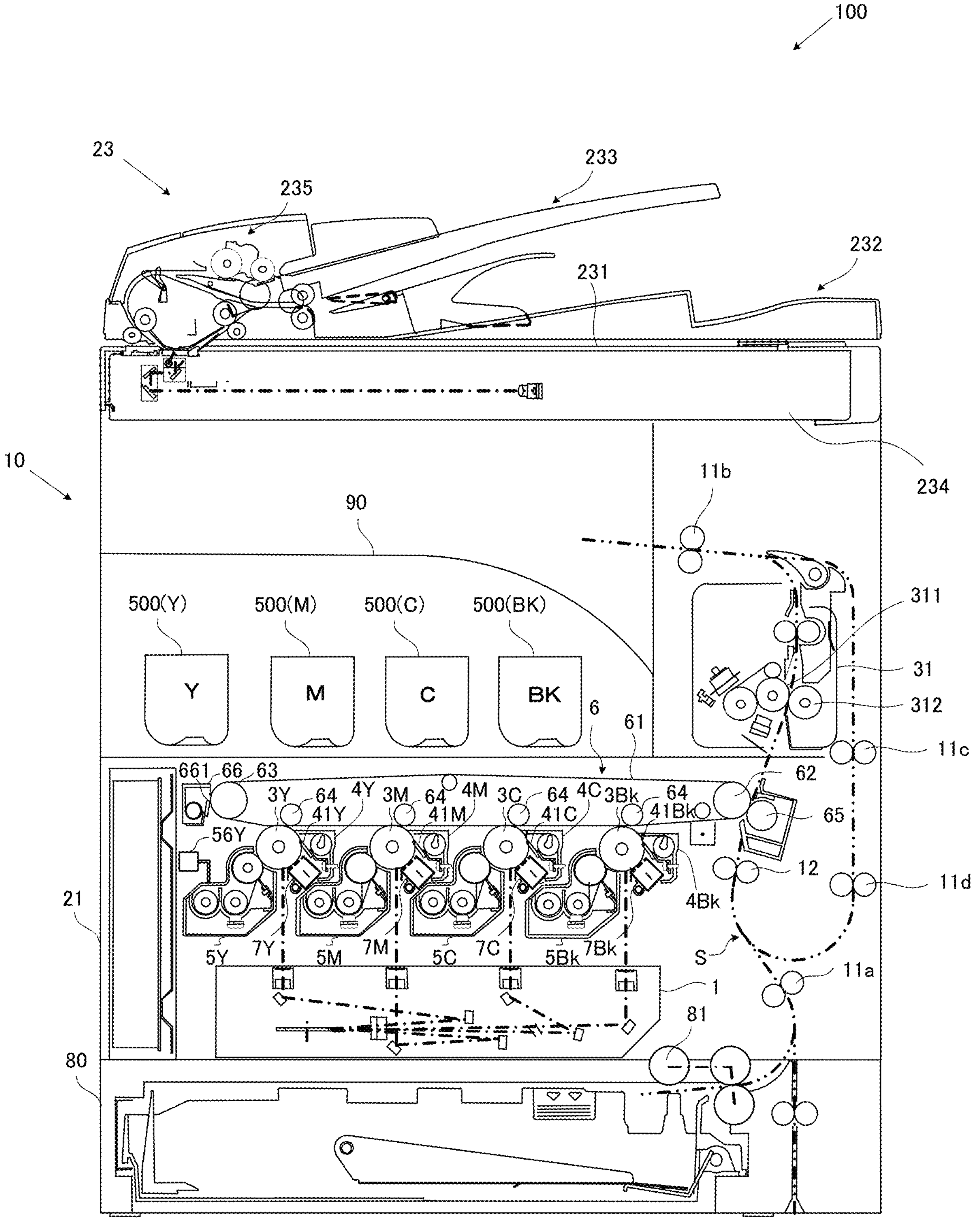
FIG. 1 is a diagram illustrating an overall configuration of an image forming device according to a first embodiment.

FIG. 1 is a front cross-sectional view illustrating an overall configuration of a multifunction machine 100 according to the first embodiment. The multifunction machine 100 includes a main body 10 that houses each member related to image formation, such as a developing device, and an image inputter 23 that is provided above the main body 10 and is capable of generating image information based on a read document. The multifunction machine 100 is an image forming device capable of outputting the image information generated by the image inputter 23 as a printed material.

A toner image former 21 and a fixer 31 are provided inside the main body 10 along a paper transport path S (dash-dot-dot line in the drawing) starting from a paper feed tray 80 and ending at a paper discharge tray 90.

The paper feed tray 80 is configured as a box-shaped member capable of housing paper sheets in a stacked state, and is detachably attached to a lower portion of the multifunction machine 100. A pickup roller 81 for picking up the housed paper sheets one by one from the top of the stack and feeding the paper sheets to the paper transport path S is provided in an upper portion of the paper feed tray 80.

The paper discharge tray 90 is formed using an outer casing of the main body 10, and accumulates printed paper sheets face-down so that the printed surface faces downward.

The paper transport path S includes a plurality of transport rollers 11*a* to 11*d*, a registration roller 12, and a transport path switcher (not shown), and the like. The transport rollers 11*a* to 11*d* are small rollers for promoting and assisting transport of paper sheets, and nip and transport each paper sheet while rotating. The registration roller 12 corrects skew of a paper sheet on the paper transport path S and transports the paper sheet to a transferrer 6 (secondary transfer roller 65) at timing at which the leading edge of the toner image formed on a surface of a photosensitive drum and the leading edge of a paper sheet are aligned with each other.

For example, in a case of single-sided printing in the forward direction with respect to the paper transport path S, a paper sheet fed from the paper feed tray 80 is transported through the transport roller 11*a*, the registration roller 12, the transferrer 6 (secondary transfer roller 65), and the fixer 31, and is discharged to the paper discharge tray 90 by the transport roller 11*b*. On the other hand, in a case of double-sided printing including transportation in the reverse direction with respect to the paper transport path S, when the leading edge of a paper sheet reaches the transport roller 11*b*, transport path switching is performed by a transport path switcher (not shown), and the transport roller 11*b* then rotates in the reverse direction to guide the paper sheet to the paper transport path S formed by the transport rollers 11*c* and 11*d*. The paper sheet having passed through the transport roller 11*d* is transported to the transferrer 6 in a state in which the printed surface is reversed. The paper sheet on which a toner image has been transferred to the back surface of the first printed surface in the transferrer 6 passes through the fixer 31, and is discharged to the discharge tray 90 by the transport roller 11*b*.

The toner image former 21 provided along the paper transport path S includes an exposure device 1, photosensitive drums 3 (3Y, 3M, 3C, and 3Bk) as image carriers, cleaners 4 (4Y, 4M, 4C, and 4Bk), developers 5 (5Y, 5M, 5C, and 5Bk) as developing devices, the transferrer 6, and chargers 7 (7Y, 7M, 7C, and 7Bk). Here, image information handled in the multifunction machine 100 corresponds to a color image using each color of yellow (Y), magenta (M), cyan (C), and black (Bk). Accordingly, the photosensitive drums 3 (3Y, 3M, 3C, and 3Bk), the cleaners 4, the developers 5, and the chargers 7 are provided so as to form four types of electrostatic latent images according to the respective colors. The photosensitive drums 3 (3Y, 3M, 3C, and 3Bk), the cleaners 4 (4Y, 4M, 4C, and 4Bk), the developers 5 (5Y, 5M, 5C, and 5Bk), and the chargers 7 (7Y, 7M, 7C, and 7Bk) may each have the same configuration across toner colors. Therefore, unless particularly limited, these components are simply described as the photosensitive drum 3, the cleaner 4, the developer 5, and the charger 7.

The exposure device 1 exposes the charged photosensitive drum 3 in accordance with image information input from the outside or image information generated by reading a document by the image inputter 23, thereby forming an electrostatic latent image on the surface of the photosensitive drum 3 in accordance with the image information. The exposure device 1 having such a configuration can be configured as, for example, a light emitting diode (LED) unit having a light emitting element such as an LED element and a lens array, or as a laser scanner having a laser emitter, a reflection mirror, and the like. The exposure device 1 is disposed at a position where irradiation light based on image information (a dash-dot line in the drawing) forms an image on the surface of the photosensitive drum 3. The exposure device 1 exposes the surface of the photosensitive drum 3 charged to, for example, −600 V to set the charging voltage of an exposed portion (electrostatic latent image portion) to −150 V.

The photosensitive drum 3 is an image carrier that forms an electrostatic latent image according to image information for each toner color. The photosensitive drum 3 can be formed as, for example, a cylindrical image carrier in which a photosensitive layer is formed on a surface of a conductive support. The photosensitive drum 3 is configured to be rotatable about an axis line of the conductive support by means of driving force supplied from a driving source (not shown) such as a motor. For the photosensitive layer, for example, a material that exhibits conductivity upon receiving light, such as amorphous silicon, selenium, selenium alloy, cadmium sulfide, zinc oxide, or an organic optical semiconductor, can be used. As the image carrier, an endless photosensitive belt can also be used instead of the photosensitive drum.

The cleaner 4 is a cleaner that collects transfer residual toner remaining on the surface of the photosensitive drum 3 after development and transfer. The cleaner 4 includes a cleaning blade 41 facing the photosensitive drum 3. A belt cleaning blade 661 collects the transfer residual toner by scraping off the transfer residual toner on the surface of the photosensitive drum 3.

The developer 5 develops the electrostatic latent image formed on each photosensitive drum 3 with toner of corresponding color among four colors of yellow (Y), magenta (M), cyan (C), and black (Bk) to form a toner image. The developer 5 develops the electrostatic latent image into a toner image using toner of each color supplied from a toner cartridge 500 (500(Y), 500(M), 500(C), 500(Bk)) mounted above the toner image former 21.

The transferrer 6 transfers the toner image formed on the surface of the photosensitive drum 3 onto a paper sheet. The transferrer 6 includes an endless intermediate transfer belt 61, an intermediate transfer belt driving roller 62, an intermediate transfer belt driven roller 63, a primary transfer roller 64, a secondary transfer roller 65, and an intermediate transfer belt cleaner 66.

The intermediate transfer belt 61 is stretched by the intermediate transfer belt driving roller 62, which is rotated by driving force supplied from a driving source (not shown), and the intermediate transfer belt driven roller 63, which is driven and rotated by driving of the intermediate transfer belt 61. The primary transfer roller 64 is provided at a position facing each photosensitive drum 3 with the intermediate transfer belt 61 interposed therebetween. A primary transfer bias for transferring the toner image formed on the surface of the photosensitive drum 3 onto the intermediate transfer belt 61 is applied to the primary transfer roller 64. The intermediate transfer belt 61 sequentially primary-transfers the toner images corresponding to the respective toner colors while being driven in a direction from the photosensitive drum (3Y) for yellow toward the photosensitive drum (3Bk) for black.

The secondary transfer roller 65 is provided so as to be in pressure contact with the intermediate transfer belt driving roller 62 via the intermediate transfer belt 61. A secondary transfer bias for secondary-transferring, onto a paper sheet transported along the paper transport path S, the toner image primary-transferred to the intermediate transfer belt 61 is applied to the secondary transfer roller 65.

The intermediate transfer belt cleaner 66 is a cleaner that collects transfer residual toner remaining on the intermediate transfer belt 61. The intermediate transfer belt cleaner 66 includes a belt cleaning blade 661 that abuts on the intermediate transfer belt 61 with a predetermined pressure. The belt cleaning blade 661 collects the transfer residual toner by scraping off the transfer residual toner on the intermediate transfer belt 61.

The charger 7 charges the surface of the photosensitive drum 3 to a predetermined potential. As the charger 7, for example, a corona discharge device, a brush-type charging device, a roller-type charging device, an ion generating device, or the like can be used.

The fixer 31 includes a heat roller 311 and a pressurizing roller 312. The fixer 31 is provided downstream along the paper transport path relative to a secondary transfer position formed by the secondary transfer roller 65 and the intermediate transfer belt driving roller 62. The heat roller 311 incorporates, for example, a heating element (not shown) such as a ceramic heater, and the temperature thereof is controlled so that a pressing member formed with the pressurizing roller 312 has a predetermined fixing temperature. The paper sheet on which the toner image has been transferred is nipped by the pressing member formed by the heat roller 311 maintained at the predetermined fixing temperature and the pressurizing roller 312 and transported therethrough, whereby heat and pressure are applied, and the toner image on the paper sheet is thermally fixed.

The fixer 31 according to the present disclosure is configured such that the pressure contact force applied by the pressing member formed by the heat roller 311 and the pressurizing roller 312 can be adjusted to either a first pressure contact force or a second pressure contact force that is weaker than the first pressure contact force by a user operating an adjuster 33 described later.

Figure 2:
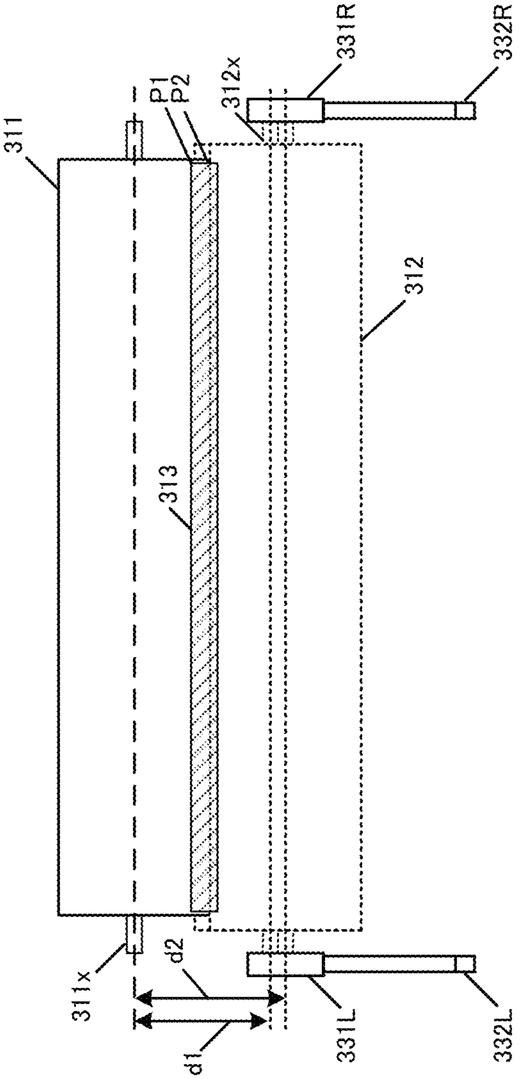
FIG. 2 is a diagram illustrating a configuration of an adjuster according to the first embodiment.

A configuration of the adjuster 33 according to the present disclosure will be described. The adjuster 33 adjusts the pressure contact force applied by the pressing member formed by the heat roller 311 and the pressurizing roller 312 to either a first pressure contact force or a second pressure contact force that is weaker than the first pressure contact force. FIG. 2 is a diagram schematically illustrating the arrangement (abutment) relationship between the heat roller 311 and the pressurizing roller 312. The heat roller 311 and the pressurizing roller 312 forms a pair of rollers, and surfaces of the rollers abut on each other at a predetermined pressure contact force to form a pressing member 313.

The adjuster 33 includes, as adjustment members, operation levers 332R and 332L and adjustment mechanisms 331R and 331L that change the shaft-to-shaft distance d between a shaft 311*x* of the heat roller 311 and a shaft 312*x* of the pressurizing roller 312. The adjustment mechanisms 331R and 331L include a shaft-to-shaft distance adjustment mechanism (not shown) composed of, for example, an elastic member such as a spring, a cam, a linkage, and the like and are provided at the left and right ends of the shaft 312*x* of the pressurizing roller 312, respectively. The operation levers 332R and 332L are respectively connected to the adjustment mechanisms 331R and 331L. The operation levers 332R and 332L are configured to be rotatable around a rotation pivot point (not shown) in response to an operation in the vertical direction by a user. The adjuster 33 according to the present disclosure adjusts the shaft-to-shaft distance d between the heat roller 311 and the pressurizing roller 312 to either d1 (abutment position P1) or d2 (abutment position P2) by the user operating the operation levers 332R and 332L. The pressure contact force applied by the pressing member 313 at the abutment position P1 is referred to as a first pressure contact force in the present disclosure, and the pressure contact force applied by the pressing member 313 at the abutment position P2 is referred to as a second pressure contact force in the present disclosure. The second pressure contact force in relation to the abutment position P2 is weaker than the first pressure contact force since the shaft-to-shaft distance d2 is longer than the shaft-to-shaft distance d1 in relation to the abutment position P1. In the following description, the lever positions of the operation levers 332R and 332L at the abutment position P1 (first pressure contact force) may be referred to as pressure contact positions, and the lever positions of the operation levers 332R and 332L at the abutment position P2 (second pressure contact force) may be referred to as pressure contact release positions. In addition, the operation levers 332R and 332L may be simply referred to as an operation lever 332 when it is not necessary to distinguish left and right.

Referring back to FIG. 1, the image inputter 23 provided above the main body 10 includes a document table 231 having a transparent material such as transparent glass. A document pressing cover 232 that can be opened and closed via a hinge (not shown) or the like is provided above the document table 231. A document feed tray 233 is attached to an upper portion of the document pressing cover 232, and an automatic document feeder 235 that transports a document set in the document feed tray 233 to a document reader 234 is provided inside the document feed tray 233.

The document reader 234 includes a light source, a plurality of reflection mirrors, an imaging lens, a line sensor having a light receiving element, and the like. The document reader 234 focuses reflected light, which is obtained by reflecting light emitted from the light source on a reading surface of the document, onto the imaging lens by the plurality of reflection mirrors. The reflected light converging on the imaging lens forms an image on the light receiving element of the line sensor. The line sensor detects the luminance and chromaticity of the reflected light forming the image on the light receiving element, and image data are generated based on the image on the reading surface of the document. As the line sensor, for example, a charge coupled device (CCD), a contact image sensor (CIS), or the like can be used.

1.2. Functional Configuration

Figure 3:
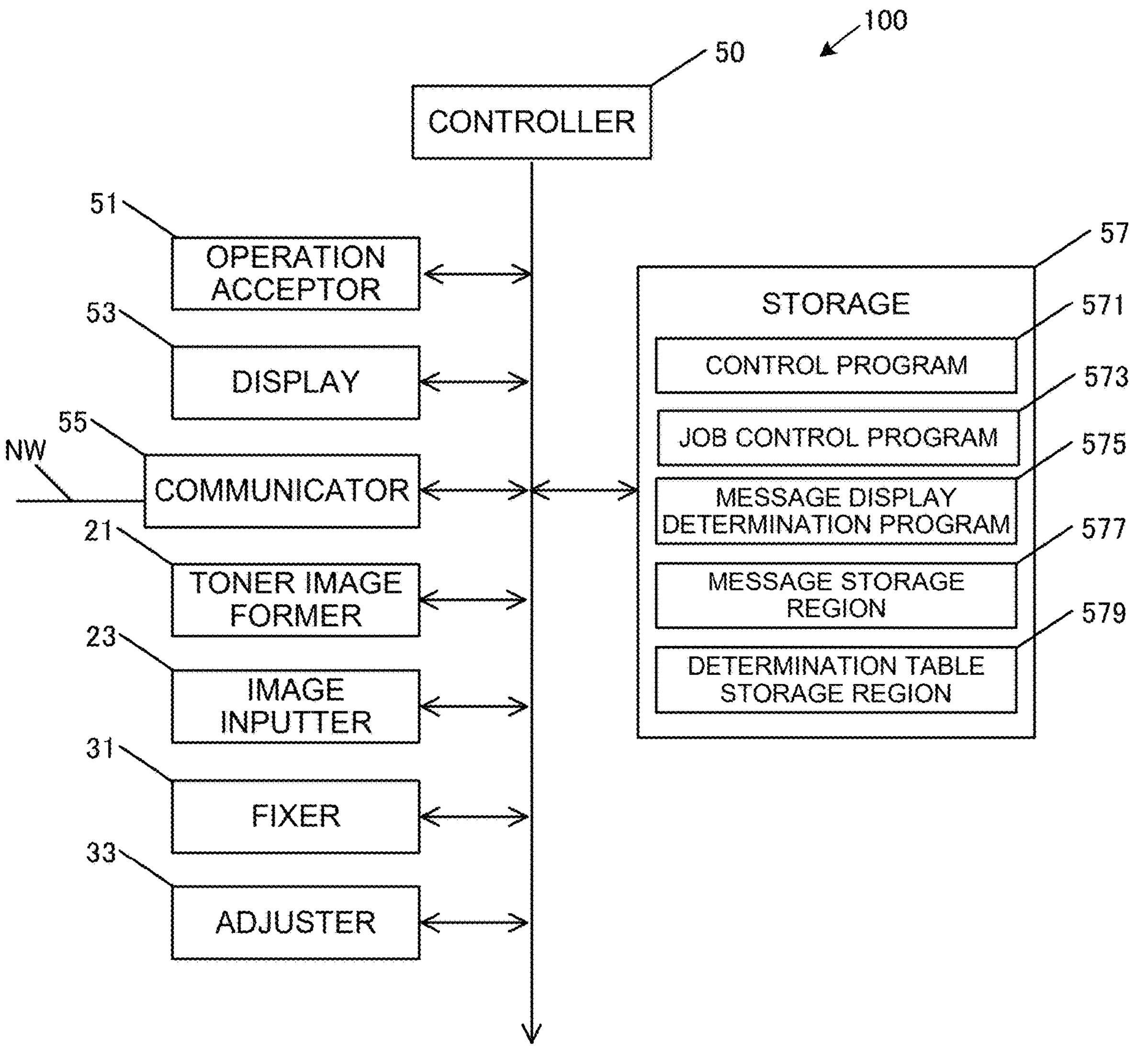
FIG. 3 is a diagram illustrating a functional configuration of the image forming device according to the first embodiment.

Next, a functional configuration of the multifunction machine 100 will be described using FIG. 3. Incidentally, description of the configurations already described with reference to FIGS. 1 and 2 are omitted. The multifunction machine 100 includes a controller 50, an operation acceptor 51, a display 53, a communicator 55, the toner image former 21, the image inputter 23, the fixer 31, the adjuster 33, and a storage 57.

The controller 50 comprehensively controls the multifunction machine 100. The controller 50 can be composed of one or more processors (for example, central processing unit (CPU), system on chip (SoC), etc.). The controller 50 reads various programs stored in the storage 57 and executes same, thereby realizing functions thereof.

The operation acceptor 51 is an input device that receives an input of information from a user or the like. The operation acceptor 51 can be composed of, for example, various input devices such as an operation key including a hardware key and a software key, and a button. The operation acceptor 51 can also be configured, for example, as a touch panel capable of input through the display 53 such as a liquid crystal display (LCD) or an organic electro-luminescence (EL) display. When the operation acceptor 51 is configured as a touch panel, coordinate information, pressure-sensitive information, and the like on the touch panel can be acquired. In this case, as an input method for the touch panel, a common method such as resistive, infrared, electromagnetic induction, or capacitive touch panel can be adopted, for example.

The display 53 is a display device that displays various pieces of information to a user. The display 53 can be composed of, for example, a display device such as an LCD, or an organic EL display.

The communicator 55 includes either a wired or wireless interface, or includes both wired and wireless interfaces for communicating with another device (not shown) via a network NW such as local area network (LAN), wide area network (WAN), the Internet, a telephone line, or a fax line, for example. The communicator 55 may include, for example, an interface related to (short-range) wireless communication technologies such as Bluetooth (registered trademark), near field communication (NFC), Wi-Fi (registered trademark), ZigBee (registered trademark), infrared data association (IrDA), and wireless universal serial Bus (USB).

In addition to the configuration described in FIG. 1, the image inputter 23 may be configured as an interface capable of acquiring image information stored in a storage medium such as a USB memory and image information sent from an external device (not shown), for example.

The storage 57 is one or more storage devices storing various programs and various data required for operation of the multifunction machine 100. The storage 57 can be composed of a storage device such as a random access memory (RAM), a solid state drive (SSD), a hard disk drive (HDD), or a read only memory (ROM), for example.

In the first embodiment, the storage 57 stores a control program 571, a job control program 573, and a message display determination program 575 and secures a message storage region 577 and a determination table storage region 579.

The control program 571 is a program read by the controller 50 when comprehensively controlling the multifunction machine 100. The controller 50 having read the control program 571 controls driving of hardware such as the operation acceptor 51, the display 53, the communicator 55, the toner image former 21, the image inputter 23, the fixer 31, and the adjuster 33.

The job control program 573 is a program read by the controller 50 when executing each job such as printing, copying, faxing, or e-mailing. The controller 50 having read the job control program 573 switches to a job mode (print mode, copy mode, fax mode, email mode) for executing each job and executes the job. In executing a job, the controller 50 causes a touch panel configured as the operation acceptor 51 (display 53) to display a job execution screen that receives selection of a function and a setting required for execution of the job requested by a user or to display a notification screen that notifies a user of a message, as necessary. The controller 50 can execute a job based on the setting or function received through the execution screen of the job.

The message display determination program 575 is a program read by the controller 50 when determining whether a print job is executed by the fixer 31 applying a pressure contact force adjusted to either the first pressure contact force or the second pressure contact force. The controller 50 having read the message display determination program 575 provides a user with a notification (message) that prompts the user to operate the operation lever 332 according to the determination result.

The message storage region 577 is a storage region where at least notification (message) information on notification provided by the controller 50 having read the message display determination program 575 is stored.

The determination table storage region 579 is a storage region where a table value referred to by the controller 50 having read the message display determination program 575 is stored as a determination table. Here, one configuration of a determination table 5791 stored in the determination table storage region 579 will be described using FIG. 4.

FIG. 4 indicates that when the paper type for the print job is type A which is regular paper, the lever position of the operation lever 332 is the pressure contact position (first pressure contact force_fixation pressure contact), and an acknowledgment message at this time is acknowledgment message A, for example.

Meanwhile, FIG. 4 indicates that when the paper type for the print job is type B which is envelopes, the lever position of the operation lever 332 is the pressure contact release position (second pressure contact force_release of fixation pressure), and the acknowledgment message at this time is acknowledgment message B, for example.

The controller 50 refers to the determination table 5791 and thus can determine, on the basis of the paper type, whether the job to be executed is a print job (paper type: regular paper) according to type A or a print job (paper type: envelopes) according to type B.

1.3. Processing Flow

Figure 5:
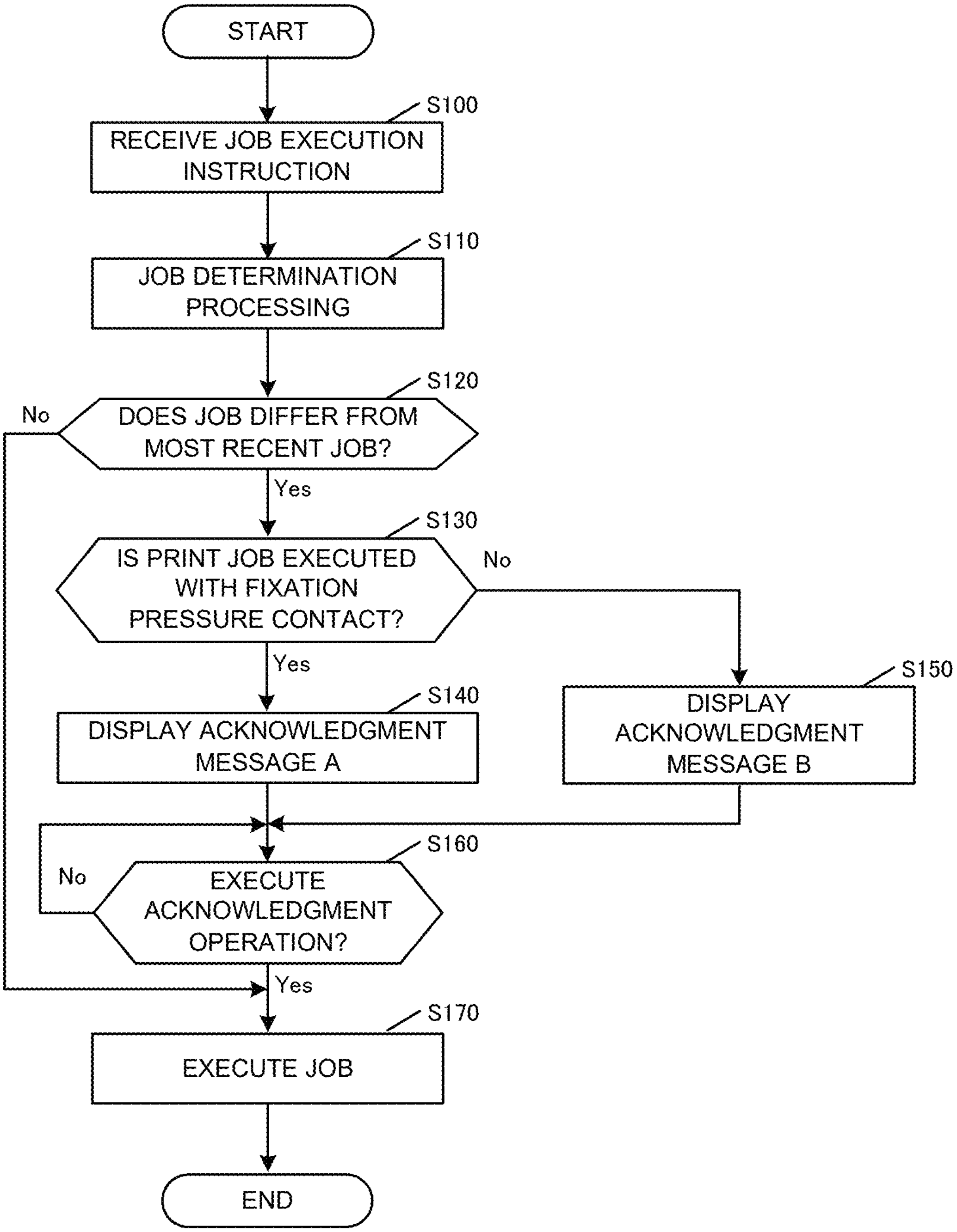
FIG. 5 is a flowchart illustrating a processing flow according to the first embodiment.

Next, a processing flow according to the first embodiment will be described using the flowchart shown in FIG. 5. Note that the processing illustrated in FIG. 5 is processing executed when the controller 50 of the multifunction machine 100 reads the control program 571, the job control program 573, the message display determination program 575, and the like.

When the processing starts, the controller 50 receives a job execution instruction through a job execution screen or the like (step S100). When the job execution instruction is received, the controller 50 checks the type of the received job, setting related to execution of the job, and the like (step S110).

Then, the controller 50 determines whether the job for which the execution instruction has been received differs from a most recently (previously) executed job (step S120). When the controller 50 determines that the job for which the execution instruction has been received is the same as the most recently executed job, the controller 50 executes the job for which the execution instruction has been received and completes the processing (No in step S120, the processing then progresses to step S170 and further to end).

When the controller 50 determines that the job for which the execution instruction has been received differs from the most recently executed job, the controller 50 determines whether the job for which the execution instruction has been received is a print job of type A executed with fixation pressure contact (Yes in step S120, the processing then progresses to step S130).

When the controller 50 determines that the job for which the execution instruction has been received is a print job of type A executed with fixation pressure contact, the controller 50 displays a notification containing acknowledgment message A shown in FIG. 4 (Yes in step S130, the processing then progresses to step S140). Meanwhile, when the controller 50 determines that the job for which the execution instruction has been received is a print job of type B (release of fixation pressure), which is not executed with fixation pressure contact, the controller 50 displays a notification containing acknowledgment message B shown in FIG. 4 (No in step S130, the processing then progresses to step S150).

After the notification of message A or message B, the controller 50 determines whether an acknowledgment operation is executed by a user (step S160). When it is determined that the acknowledgment operation is executed by a user, the controller 50 executes the job and completes the processing (Yes in step S160, the processing then progresses to step S170 and further to end). On the other hand, when it is determined that the acknowledgment operation is not executed by a user, the controller 50 waits until a user executes the acknowledgment operation (No in step S160).

1.4. Operation Example

Figure 6:
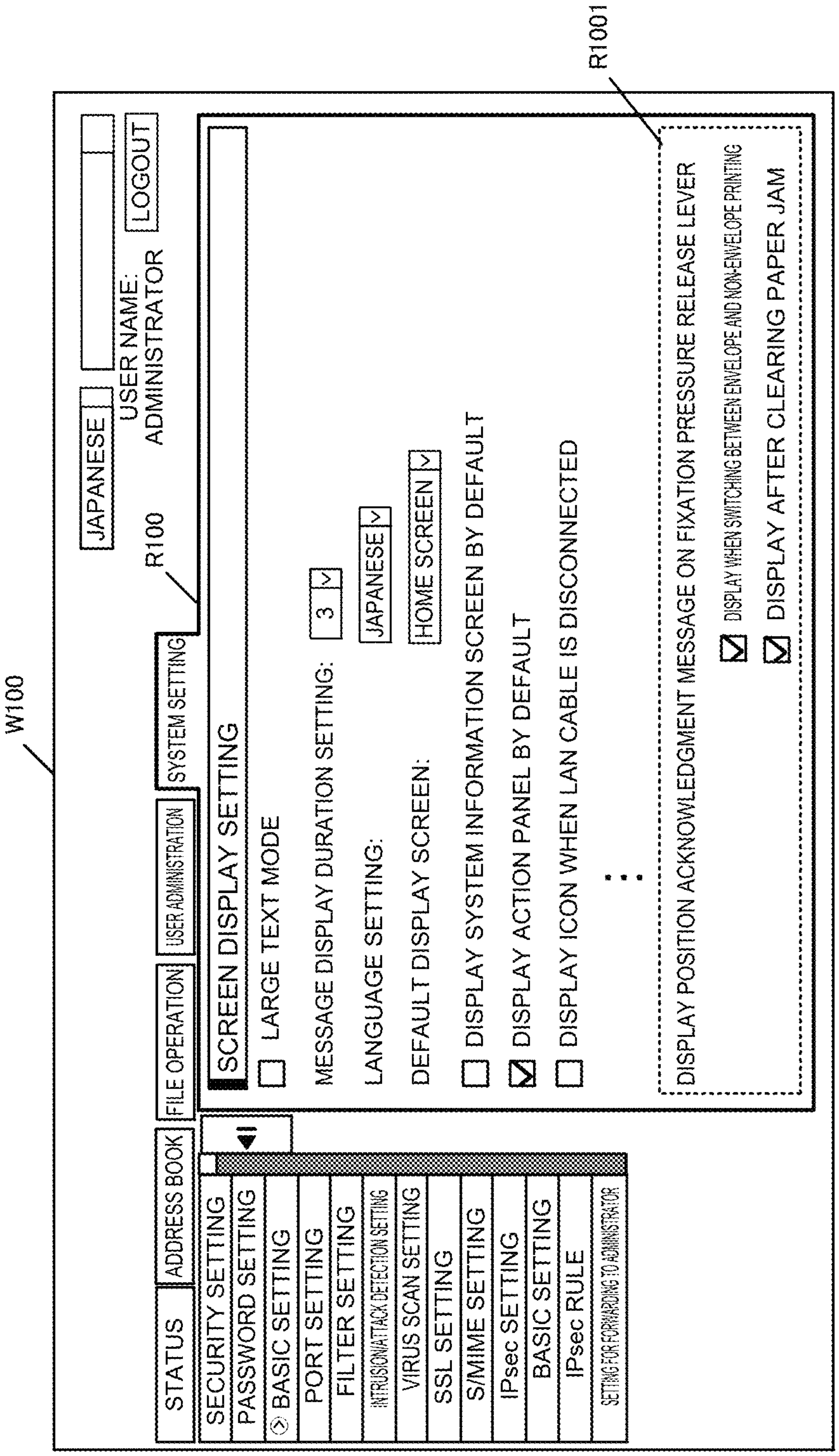
FIG. 6 is a diagram illustrating an operation example according to the first embodiment.

Next, an operation example according to the first embodiment will be described. FIG. 6 is a diagram illustrating one configuration example of a system setting screen W100 according to the present disclosure.

The system setting screen W100 includes a system setting region R100. The system setting region R100 is provided with a setting region R1001 receiving a setting related to the display of a position acknowledgment message on the position of a fixation pressure release lever as the operation lever 332. When a user desires the display of the position acknowledgment message when switching between envelope printing and non-envelope printing, the user checks a "display message when switching between envelope printing and non-envelope printing" checkbox, making it possible to display the position acknowledgment message on the position of the operation lever 332 when switching between envelope printing and non-envelope printing (first embodiment). When the user desires the display of the position acknowledgment message on the position of the operation lever 332 after clearing a paper jam, the user checks a "display message after clearing paper jam" checkbox, making it possible to display the position acknowledgment message on the position of the operation lever 332 when a paper jam is cleared (second embodiment).

Figure 7B:
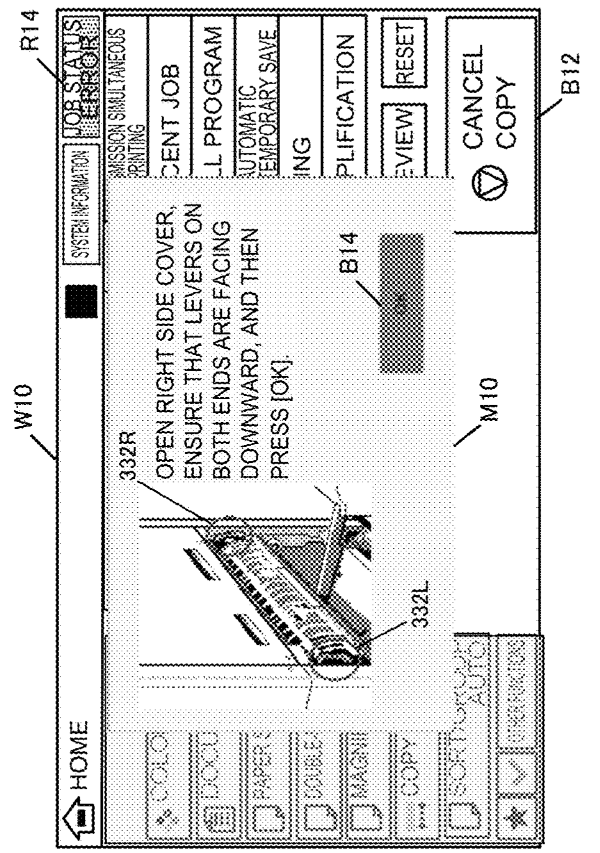
FIGS. 7A and 7B are diagrams illustrating the operation example according to the first embodiment.
Figure 7A:
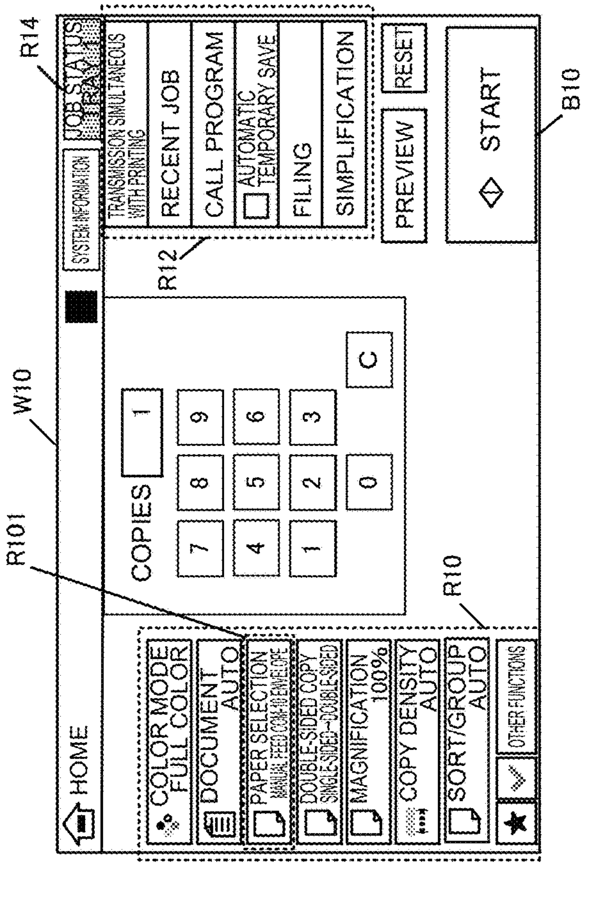

FIG. 7A is a diagram illustrating one configuration example of the job execution screen W10 related to a print job. The job execution screen W10 can be displayed on the basis of a call instruction through a home screen (not shown) or the like, for example. The job execution screen W10 related to the print job includes a setting display region R10, a function selection region R12, a job status display region R14, and a start button B10.

The setting display region R10 is a display region displaying setting items related to execution of a print job and settings. FIG. 7A is an example displaying settings related to "color mode," "document," "paper selection R101," "double-sided copy," "magnification," "copy density," "sort/group," and the like as the settings displayed on the setting display region R10. The settings displayed on the setting display region R10 can be appropriately changed by a user.

The function selection region R12 is a display region displaying a function selection key receiving selection of a selectable function when a print job is executed. FIG. 7A is an example in which a "key for transmission simultaneous with printing," "recent job key," "program call key," "automatic temporary save key," "filing key," "simplification key" receiving transition to a simple execution screen, and the like are displayed as the function selection key.

While a job is being executed, the job status display region R14 is a display region displaying an execution status of the job. As in the example of FIG. 7A, additional information (tray information "tray 1" used for feeding regular paper sheets, for example) related to execution of the job can be displayed on the job status display region R14, for example.

The start button B10 is a button receiving a job execution instruction. When the start button B10 is selected by a user, the controller 50 executes a print job.

Incidentally, the job execution screen W10 illustrated in FIG. 7A represents a state where the setting item "paper selection" in the setting display region R10 has been changed by a user from regular paper to envelopes. When the setting item "paper selection" is changed from regular paper to envelopes, the controller 50 executes job determination processing related to step S100 to step S130 described with reference to FIG. 5. The controller 50 may execute the job determination processing related to step S100 to step S130 after receiving the selection of the start button B10 by the user.

In the example of FIG. 7A, since the setting item "paper selection" has been changed from regular paper to envelopes, the controller 50 determines that the print job received through the job execution screen W10 differs from the most recent print job (Yes in step S120). The controller 50 refers to the determination table 5791 illustrated in FIG. 4 and thereby determines that the print job received through the job execution screen W10 is type B related to the second pressure contact force (release of fixation pressure) on the basis of the changed paper type (No in step S130). Then, the controller 50 determines to display acknowledgment message B (No in step S130, the processing then progresses to step S150).

FIG. 7B is a diagram illustrating a display configuration example of acknowledgment message B superimposed on the job execution screen W10 and displayed by the controller 50. Acknowledgment message B can be configured as a message screen M10 including an OK button B14 and a message to confirm the lever position at which the operation lever 332 is in the pressure contact release position, which is a message containing a notification indicating that "open right side cover, ensure that levers on both ends are facing downward, and then press [OK]."

Since the right side cover of the multifunction machine 100 is open at this time, execution (operation to form a toner image) of a print job is impossible. Accordingly, "error" is displayed on the job status display region R14 as the job status.

Figure 8:
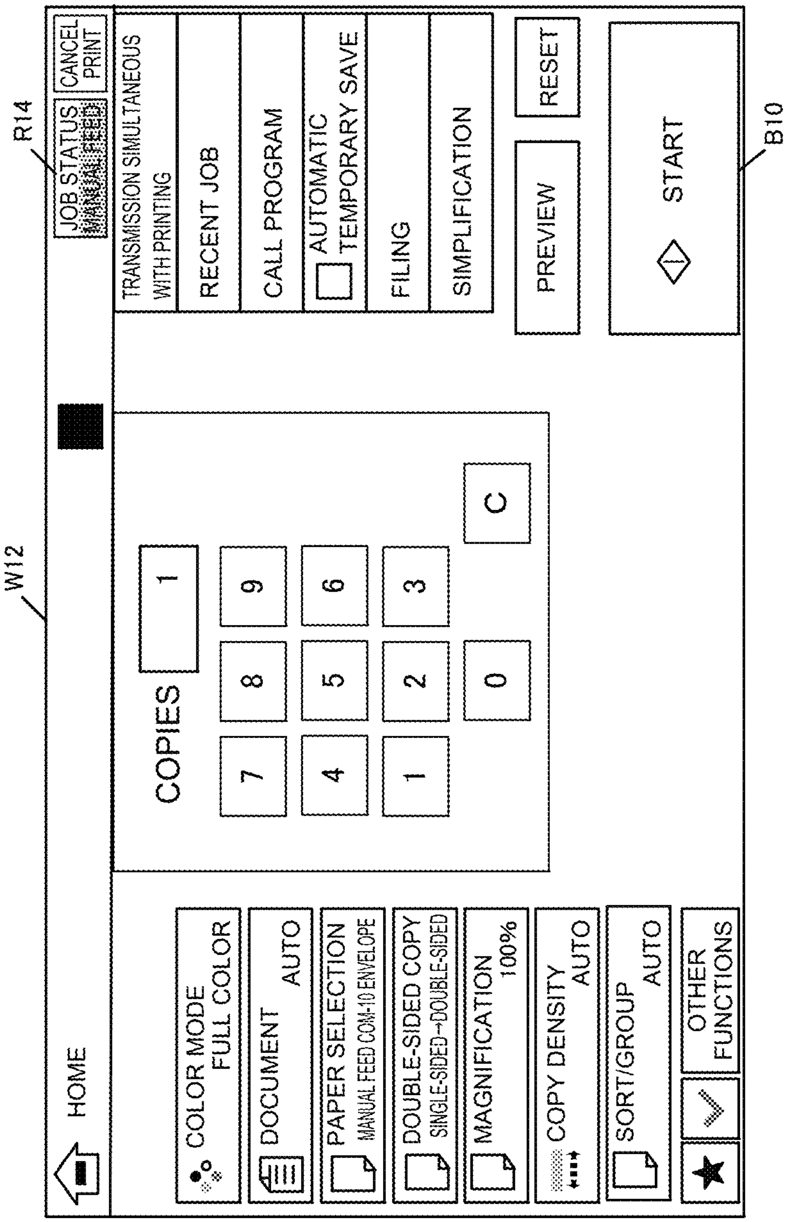
FIG. 8 is a diagram illustrating the operation example according to the first embodiment.

When a user appropriately operates the operation lever 332 and selects the OK button B14, the controller 50 terminates the display of the message screen M10 and transitions the screen to the job execution screen W12 shown in FIG. 8 (Yes in step S160, the processing then progresses to step S170).

The job execution screen W12 illustrated in FIG. 8 indicates that the display in the job status display region R14 is changed to "manual feed," and execution of a print job using an envelope is possible. Then, upon receiving the selection of the start button B10 by the user, the controller 50 executes the print job.

Figure 9B:
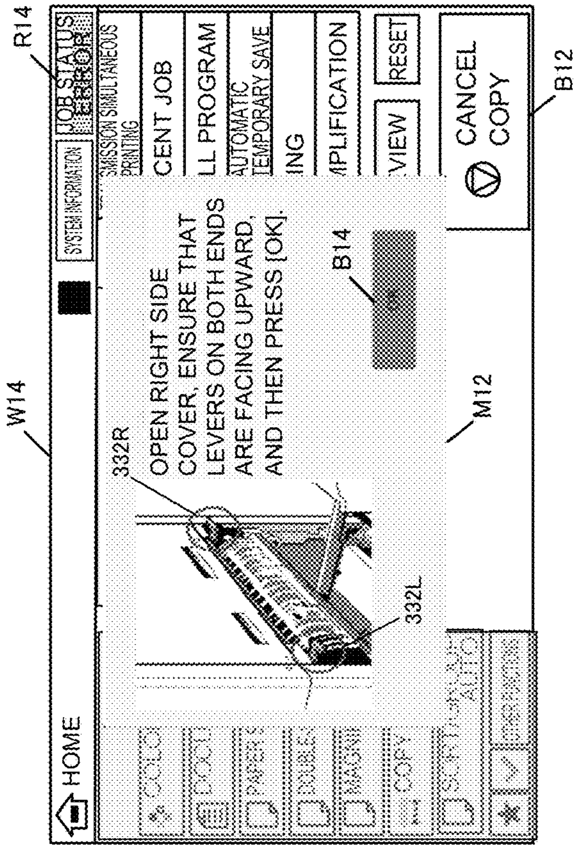
FIGS. 9A and 9B are diagrams illustrating the operation example according to the first embodiment.
Figure 9A:
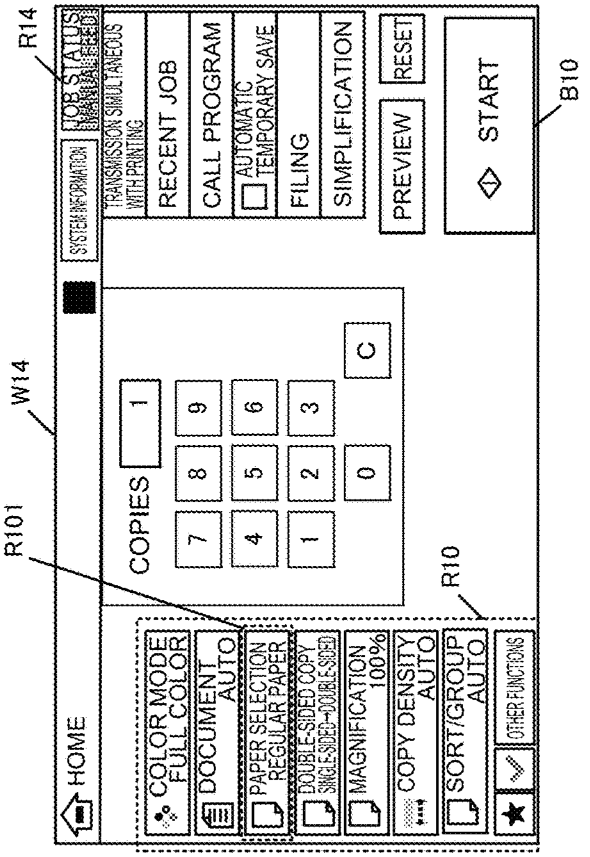

The job execution screen W14 illustrated in FIG. 9A represents a state where the setting item "paper selection" in the setting display region R10 has been changed by a user from envelopes to regular paper. When the setting item "paper selection" is changed from envelopes to regular paper, the controller 50 executes the job determination processing related to step S100 to step S130 described with reference to FIG. 5. The controller 50 may execute the job determination processing related to step S100 to step S130 after receiving the selection of the start button B10 by the user.

In the example of FIG. 9A, since the setting item "paper selection" has been changed from envelopes to regular paper, the controller 50 determines that the print job received through the job execution screen W10 differs from the most recent print job (Yes in step S120). The controller 50 refers to the determination table 5791 illustrated in FIG. 4 and thereby determines that the print job received through the job execution screen W10 is type A related to the first pressure contact force (fixation pressure contact) on the basis of the changed paper type (Yes in step S130). Then, the controller 50 determines to display acknowledgment message A (Yes in step S130, the processing then progresses to step S140).

FIG. 9B is a diagram illustrating a display configuration example of acknowledgment message A superimposed on the job execution screen W14 and displayed by the controller 50 displays. Acknowledgment message A can be configured as a message screen M12 including an OK button B14 and a message to confirm the lever position at which the operation lever 332 is at the pressure contact position, which is a message containing a notification indicating that "open right side cover, ensure that levers on both ends are facing upward, and then press [OK]."

Since the right side cover of the multifunction machine 100 is open at this time, execution (operation to form a toner image) of a print job is impossible. Accordingly, "error" is displayed on the job status display region R14 as the job status.

Figure 10:
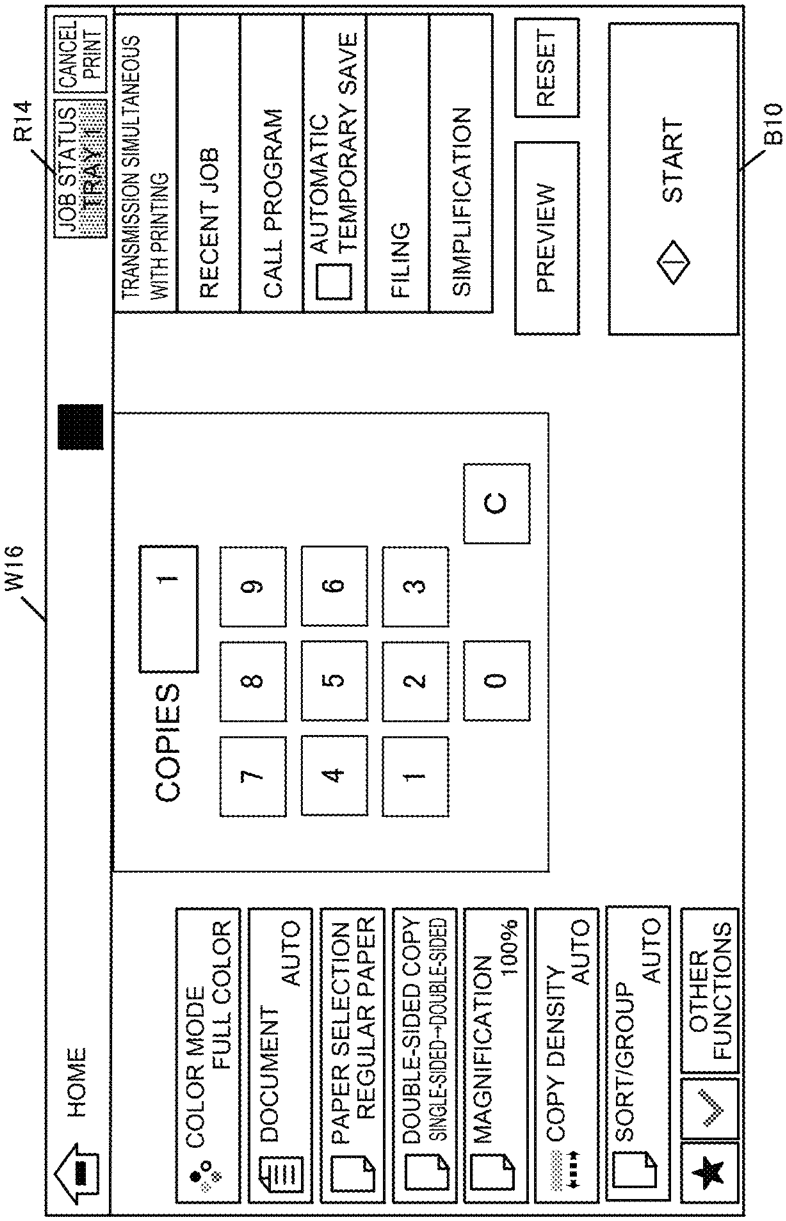
FIG. 10 is a diagram illustrating the operation example according to the first embodiment.

When a user appropriately operates the operation lever 332 and selects the OK button B14, the controller 50 terminates the display of the message screen M12 and transitions the screen to the job execution screen W16 shown in FIG. 10 (Yes in step S160, the processing then progresses to step S170).

The job execution screen W16 illustrated in FIG. 10 indicates that the display of the job status display region R14 is changed to "tray 1," and execution of a print job using regular paper is possible. Then, upon receiving the selection of the start button B10 by the user, the controller 50 executes the print job.

As described above, according to the first embodiment, by providing a user with a notification that prompts the user to operate the adjuster for adjusting the pressure contact force in the fixer to either the first pressure contact force related to a print job using regular paper or the second pressure contact force related to a print job using an envelope in accordance with the previously executed job, a malfunction due to a forgotten operation or an erroneous operation can be prevented even when an event involving a change in the pressure contact force in the fixer occurs.

2. Second Embodiment

In a second embodiment, when a paper jam occurs, a user is provided with a notification that prompts the user to operate the operation lever 322 in accordance with the previously executed job.

Since the overall configuration and the functional configuration according to the second embodiment can be configured in the same manner as in the first embodiment, the description thereof will be omitted here.

2.1. Processing Flow

Figure 11:
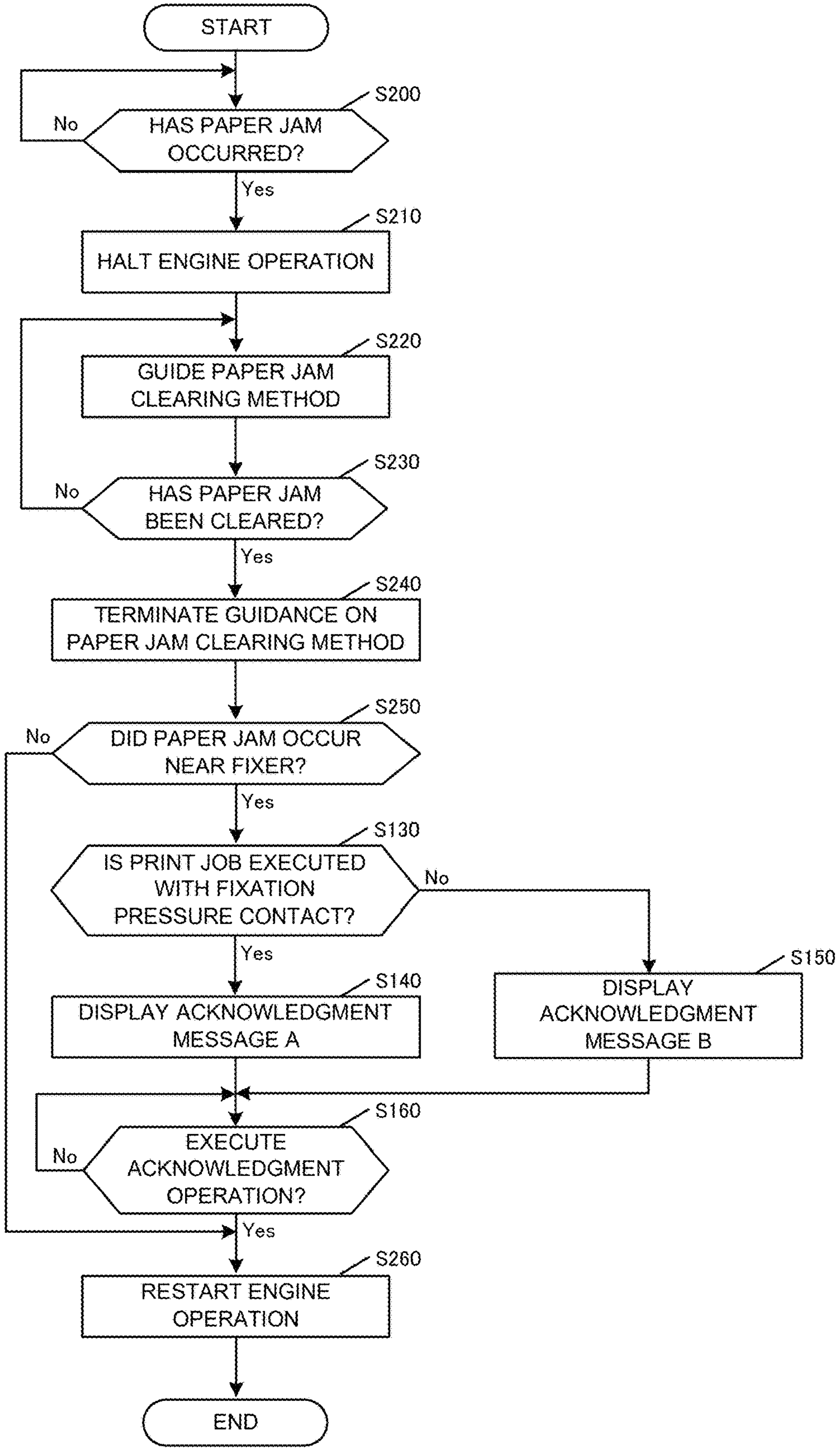
FIG. 11 is a flowchart illustrating a processing flow according to a second embodiment.

A processing flow according to the second embodiment can be described by replacing the flowchart in FIG. 5 according to the first embodiment with the flowchart in FIG. 11. Accordingly, the same steps as those in FIG. 5 are denoted by the same step numbers, and the description thereof may be omitted.

When the processing starts, the controller 50 monitors various mechanics of the multifunction machine 100, such as the paper transport path S and the fixer 31 or the paper feed tray 80 or the like, and determines whether a paper jam has occurred (step S200). When the controller 50 determines that a paper jam has occurred during monitoring, the controller 50 halts the operation of an image forming engine such as the toner image former 21 (Yes in step S200, the processing then progresses to step S210). Note that when the controller 50 determines that no paper jam has occurred, the controller 50 continues monitoring (No in step S200).

After the image forming engine is halted, the controller 50 provides guidance on a paper jam clearing method (step S220). The guidance on the paper jam clearing method can be provided, for example, by displaying, on the display 53, guidance such as a photograph, illustration, or animation explaining how to remove a paper sheet causing a paper jam from the inside of the device.

The controller 50 determines whether the paper sheet causing the paper jam is removed from the multifunction machine 100, and the paper jam has been cleared (step S230). When the controller 50 determines that the paper jam has been cleared, the controller 50 terminates the guidance on the paper jam clearing method (Yes in step S230, the processing then progresses to step S240). On the other hand, when the controller 50 determines that the paper jam has not been cleared, the controller 50 continues providing the guidance on the paper jam clearing method (No in step S230, the processing then progresses to step S220).

After terminating the guidance on the paper jam clearing method, the controller 50 determines whether the paper jam occurred near the fixer 31 (the processing progresses from step S240 to step S250). When the controller 50 determines that the paper jam occurred near the fixer 31, the controller 50 executes the processing related to step S130 to step S160 illustrated in FIG. 5 (Yes in step S250, the processing then progresses to step S130 to step S160). When the controller 50 determines that the paper jam did not occur near the fixer 31, the controller 50 transitions the processing to step S260 (No in step S250, the processing then progresses to step S260).

In step S260, when an acknowledgment message is displayed, the controller 50 terminates the display of the acknowledgment message, starts (restarts) a warm-up operation of the image forming engine that has halted in step S210, and stops the processing (step S260).

2.2. Operation Example

Figure 12A:
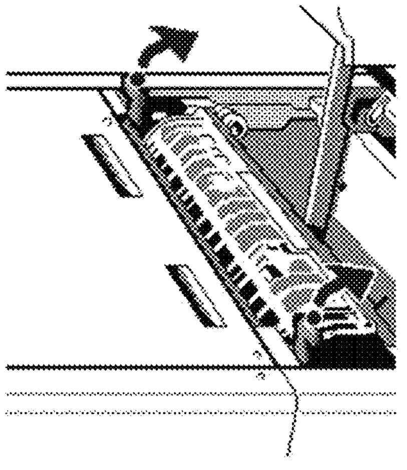
FIGS. 12A to 12C are diagrams illustrating an operation example according to the second embodiment.
Figure 12B:
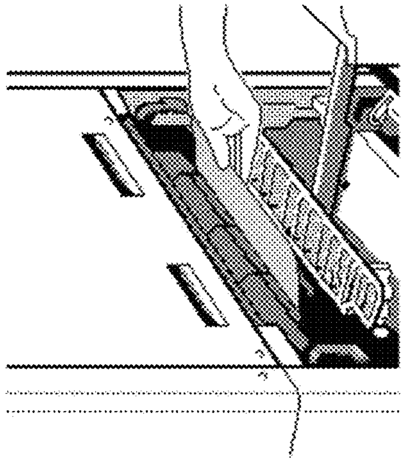
Figure 12C:
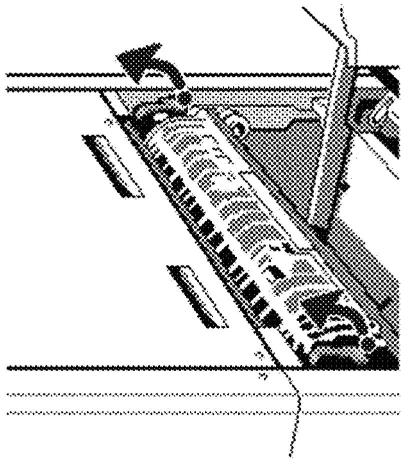

Next, an operation example according to the second embodiment will be described. FIGS. 12A to 12C are diagrams illustrating one example of the paper jam clearing method, which is displayed as the guidance, when a paper jam occurs near the fixer 31, and the next scheduled print job is a print job to be executed with fixation pressure contact (paper type is regular paper).

FIGS. 12A to 12C show an example in which an operation procedure of the paper jam clearing method is displayed with illustrations accompanied by explanatory texts shown in FIGS. 12A to 12C. When a paper jam occurs near the fixer 31 in a print job executed with fixation pressure contact, it is necessary to return the operated operation lever 332 back to the original pressure contact position in order to release the pressure contact force between the heat roller 311 and the pressurizing roller 312. Therefore, the explanatory text according to FIG. 12C ("Return both operation levers to respective original positions simultaneously.") is added to the paper jam clearing method illustrated in FIGS. 12A to 12C in addition to the explanatory texts for removing a jammed paper sheet according to FIGS. 12A and 12B ("Lower both operation levers simultaneously. Remove jammed paper." in FIG. 12A, and "Move paper slowly in direction of arrow to keep paper from tearing. Ensure no paper fragments are left." in FIG. 12B).

Figure 13A:
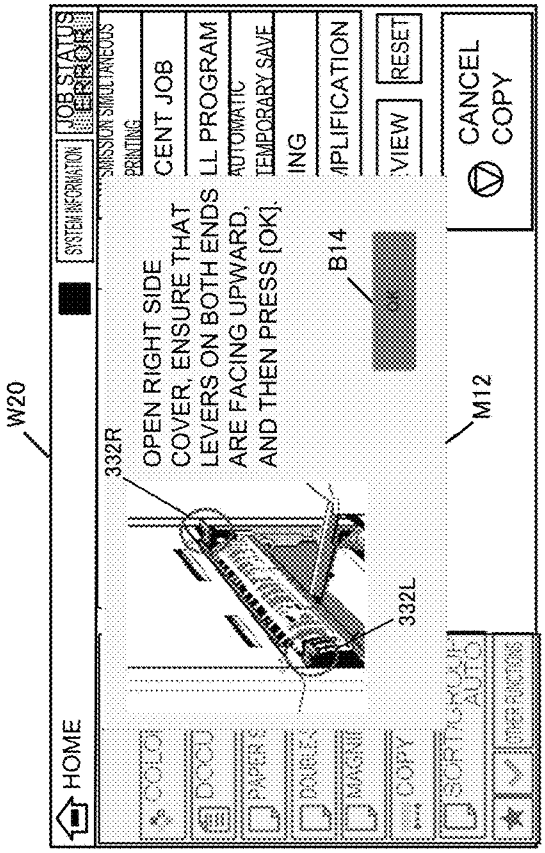
FIGS. 13A and 13B are diagrams illustrating the operation example according to the second embodiment.

FIG. 13A is a diagram illustrating a display configuration example of acknowledgment message A displayed on the job execution screen W20 by the controller 50 after the paper jam has been cleared, and a side cover (right side cover) for accessing the fixer 31 is closed. Acknowledgment message A can be configured as a message screen M12 including an OK button B14 and a message to confirm the lever position at which the operation lever 332 is at the pressure contact position, which is a message containing a notification indicating that "open right side cover, ensure that levers on both ends are facing upward, and then press [OK]," in the same manner as the first embodiment.

Figure 13B:
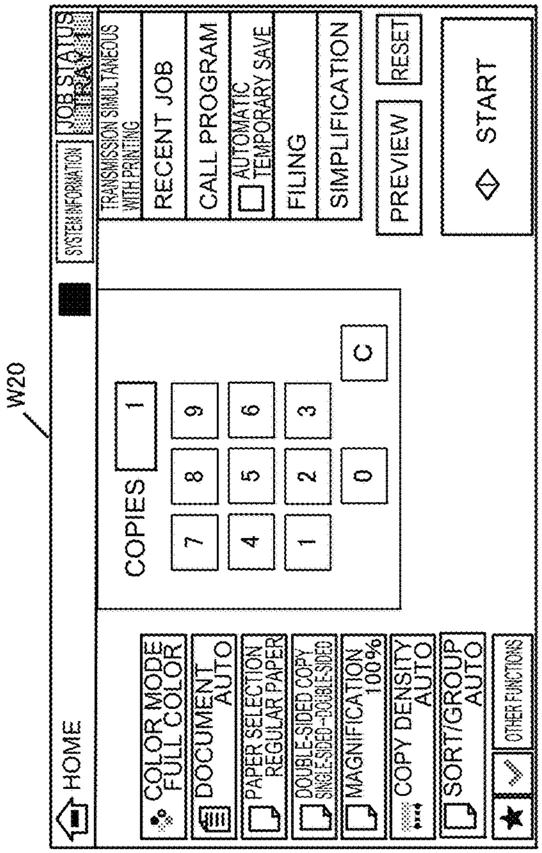

When a user appropriately operates the operation lever 332 and selects the OK button B14, the controller 50 terminates the display of the message screen M12 and displays the job execution screen W20 shown in FIG. 13B.

Figure 14A:
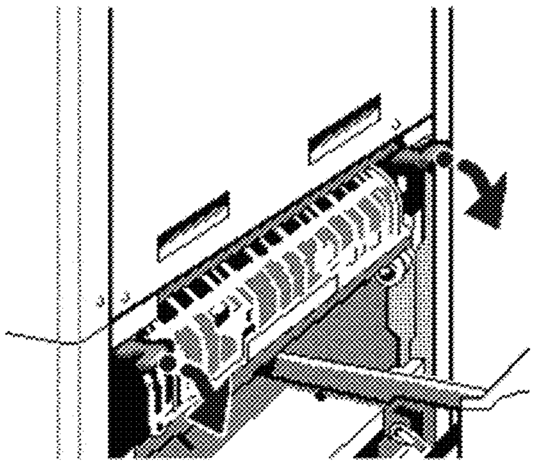
FIGS. 14A and 14B are diagrams illustrating the operation example according to the second embodiment.
Figure 14B:
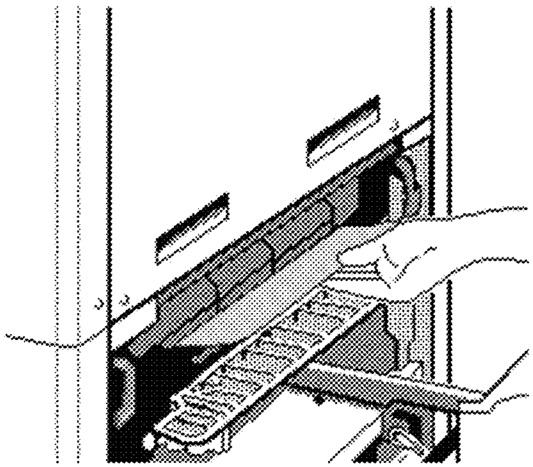

FIGS. 14A and 14B are diagrams illustrating one example of the paper jam clearing method, which is displayed as the guidance, when a paper jam occurs near the fixer 31, and the next scheduled print job is a print job to be executed with fixation pressure released (paper type is envelopes).

FIGS. 14A and 14B show an example in which an operation procedure of the paper jam clearing method is displayed with illustrations accompanied by explanatory texts shown in FIGS. 14A and 14B. When a paper jam occurs near the fixer 31 in a print job executed with fixation pressure released, it is not necessary to return the operated operation lever 332 back to the original pressure contact position for releasing the pressure contact force between the heat roller 311 and the pressurizing roller 312. Therefore, only the explanatory texts for removing a jammed paper sheet according to FIGS. 14A and 14B ("Lower both operation levers simultaneously. Remove jammed paper." in FIG. 14A, and "Move paper slowly in direction of arrow to keep paper from tearing. Ensure no paper fragments are left." in FIG. 14B) are displayed in the paper jam clearing method illustrated in FIGS. 14A and 14B.

Figure 15A:
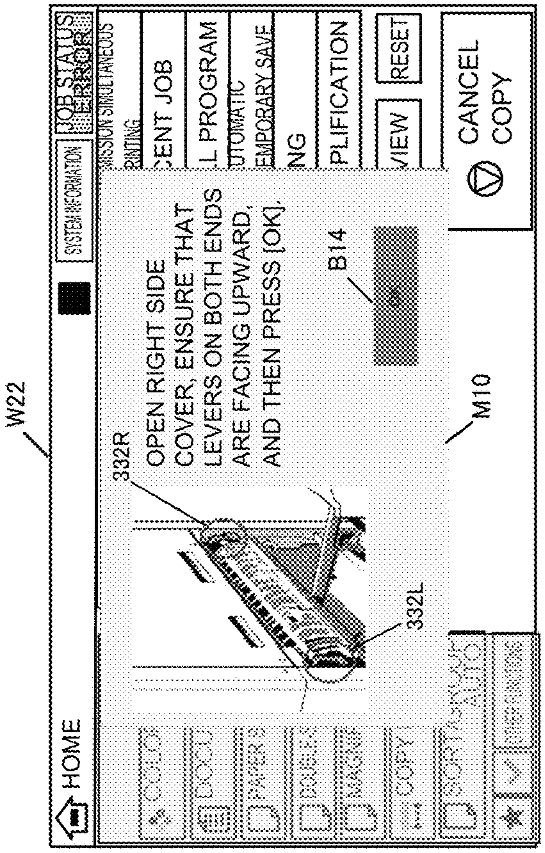
FIGS. 15A and 15B are diagrams illustrating the operation example according to the second embodiment.
Figure 15B:
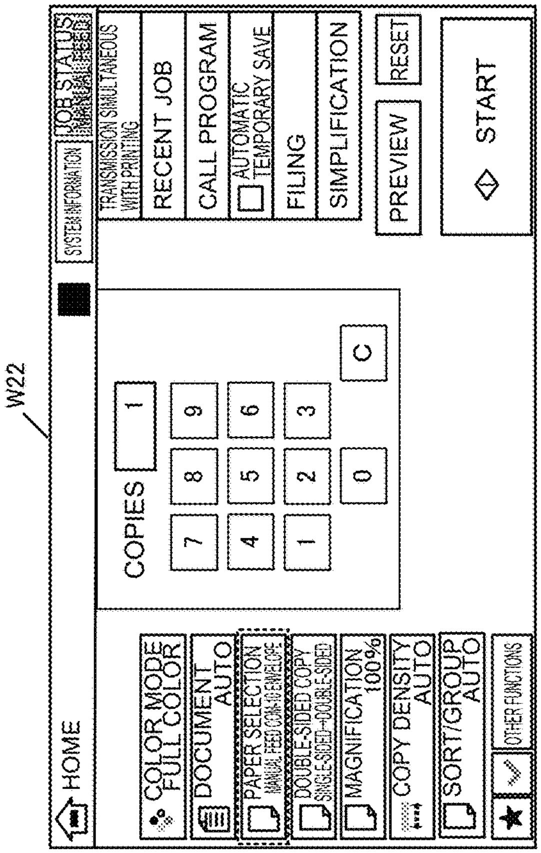

FIG. 15A is a diagram illustrating a display configuration example of acknowledgment message B displayed on the job execution screen W22 by the controller 50 after the paper jam has been cleared, and the side cover (right side cover) for accessing the fixer 31 is closed. Acknowledgment message B can be configured as a message screen M10 including an OK button B14 and a message to confirm the lever position at which the operation lever 332 is at the pressure contact release position, which is a message containing a notification indicating that "open right side cover, ensure that levers on both ends are facing downward, and then press [OK]," in the same manner as the first embodiment.

When a user appropriately operates the operation lever 332 and selects the OK button B14, the controller 50 terminates the display of the message screen M10 and displays the job execution screen W22 shown in FIG. 14B.

As described above, according to the second embodiment, a malfunction due to a forgotten operation or an erroneous operation can be prevented even when an event involving a change in the pressure contact force in the fixer occurs due to occurrence of a paper jam, in addition to the effect provided by the first embodiment.

3. Third Embodiment

In a third embodiment, an energy conservation mode such as an energy-saving mode or power discontinuity is applied to the multifunction machine 100 according to the first embodiment, for example.

Since the overall configuration and the functional configuration according to the third embodiment can be configured in the same manner as in the first embodiment, the description thereof will be omitted here. Note that although a processing flow according to the third embodiment can be carried out according to the flowchart in FIG. 5 according to the first embodiment, in the third embodiment, the paper type for a previous print job before enabling the energy conservation mode is stored, and upon recovery from energy conservation mode, if the paper type for the print job to be executed differs, the user is provided with a notification to confirm whether the operation lever 322 is positioned at the appropriate position, and the printing operation (image formation engine operation) is halted.

Figure 16:
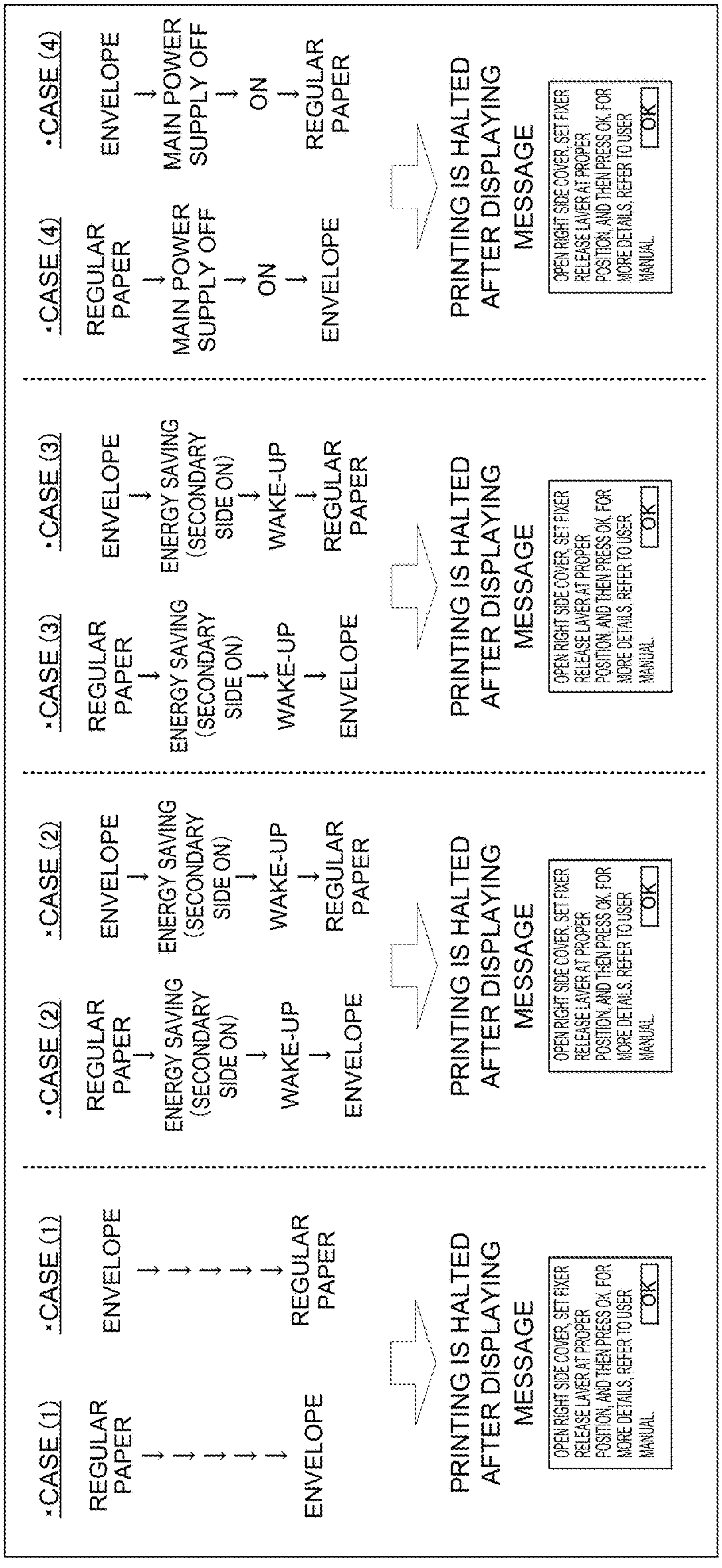
FIG. 16 is a diagram illustrating a third embodiment.

FIG. 16 is a diagram summarizing operation examples of the multifunction machine 100 according to the energy conservation mode applied.

In case (1), the energy conservation mode is not applied, and the paper type for the print job is changed from regular paper to envelopes or from envelopes to regular paper. The multifunction machine 100 in case (1) operates in the same manner as in the first embodiment, and when the paper type is changed, the printing operation is halted after displaying the message shown in FIG. 16.

In case (2), an energy-saving mode (a secondary side is in the ON position; and a primary side function such as a user interface like touch panel is in the OFF position, and a secondary side function such as control of the temperature of the fixer or a fax receiving function is in the ON position, for example) is applied to the multifunction machine 100 as the energy conservation mode. When the paper type for a previous print job is regular paper, and the paper type for a print job after waking up from the energy conservation mode has been changed to envelopes, the multifunction machine 100 in case (2) halts the printing operation after displaying the message shown in FIG. 16. In contrast, when the paper type for a previous print job is envelopes, and the paper type for a print job after waking up from the energy conservation mode has been changed to regular paper, the multifunction machine 100 in case (2) halts the printing operation after displaying the message shown in FIG. 16.

In case (3), an energy-saving mode (the secondary side is in the OFF position; and the primary side function such as a user interface like touch panel is in the OFF position, and the secondary side function such as control of the temperature of the fixer or a fax receiving function is also in the OFF position, for example) is applied to the multifunction machine 100 as the energy conservation mode. When the paper type for a previous print job is regular paper, and the paper type for a print job after waking up from the energy conservation mode has been changed to envelopes, the multifunction machine 100 in case (3) halts the printing operation after displaying the message shown in FIG. 16. In contrast, when the paper type for a previous print job is envelopes, and the paper type for a print job after waking up from the energy conservation mode has been changed to regular paper, the multifunction machine 100 in case (3) halts the printing operation after displaying the message shown in FIG. 16.

In case (4), power discontinuity (a main power supply is turned OFF) is applied to the multifunction machine 100 as the energy conservation mode. When the paper type for a previous print job is regular paper, and the paper type for a print job after powering on (the main power supply is turned ON) from power discontinuity (the main power supply is turned OFF) has been changed to envelopes, the multifunction machine 100 in case (4) halts the printing operation after displaying the message shown in FIG. 16. In contrast, when the paper type for a previous print job is envelopes, and the paper type for a print job after powering on (the main power supply is turned ON) from power discontinuity (the main power supply is turned OFF) has been changed to regular paper, the multifunction machine 100 in case (4) halts the printing operation after displaying the message shown in FIG. 16.

As described above, according to the third embodiment, a malfunction due to a forgotten operation or an erroneous operation can be prevented according to the energy conservation mode applied even when an event involving a change in the pressure contact force in the fixer occurs.

The present disclosure is not limited to the embodiments described above, and various modifications are possible. That is, embodiments obtained by combining technical features appropriately modified without departing from the spirit of the present disclosure are also included in the technical scope of the present disclosure.

Although the above-described embodiments have been partly described separately for convenience of description, it is needless to say that the embodiments may be carried out in combination within a technically feasible range.

The program that operates in each device in the embodiments is a program (a program that causes a computer to function) that controls a CPU and the like so as to realize the functions of the above-described embodiments. Information handled by these devices is temporarily accumulated in a temporary storage device (for example, a RAM) during processing, then stored in a storage device such as various ROMs, HDD, and the like, and read, modified, and written by the CPU as necessary.

Here, as a computer-readable non-transitory recording medium in which a program in an information processing devices is recorded may be any of a semiconductor medium (for example, a ROM or a nonvolatile memory card), an optical recording medium or magnetooptical recording medium (for example, digital versatile disc (DVD), magnetooptical disc (MO), mini disc (MD), compact disc (CD), or Blu-ray (registered trademark) disc (BD)), a magnetic recording medium (for example, a magnetic tape or a flexible disk), and the like. In this case, the program recorded in the recording medium is read by a computer of the information processing device and executed by the computer, so that not only the functions of the above-described embodiments are realized, but also the functions of the present disclosure are realized by processing in cooperation with an operating system, another application program, or the like on the basis of an instruction of the program.

When the program is distributed on the market, the program can be stored in a portable recording medium and distributed, or can be transferred to a server computer connected via a network such as the Internet. In this case, it is needless to say that a storage device of the server computer is also included in the present disclosure.

Each functional block or various features of a device used in the above-described embodiments can also be implemented and executed by an electric circuit, for example, an integrated circuit or a plurality of integrated circuits. An electric circuit designed to implement the functions described herein may include a general purpose processor, a digital signal processor (DSP), an application specific integrated circuit (ASIC), a field programmable gate array (FPGA), or another programmable logic device, a discrete gate or transistor logic, a discrete hardware component, or a combination thereof. The general purpose processor may be a microprocessor or a conventional processor, controller, microcontroller, or state machine. The electric circuit may be configured by a digital circuit or an analog circuit. Further, when a circuit integrating technology that replaces current integrated circuits emerges as a result of advancement of semiconductor technology, one or more aspects of the present disclosure may use a new integrated circuit according to the technology.

What is claimed is:

1. An image forming device comprising:

a toner image former that forms, on a paper sheet, a toner image based on image information;

a fixer that includes at least a pair of rollers, the pair of rollers including a heating roller and a pressurizing roller, and that fixes the toner image by nipping, at a pressure contact portion formed by the pair of rollers, the paper sheet on which the toner image is formed;

an adjuster that adjusts a pressure contact force at the pressure contact portion to either a first pressure contact force or a second pressure contact force that is weaker than the first pressure contact force; and one or more controllers that control execution of a first job related to image formation via the fixer, wherein after a paper jam that has occurred in a vicinity of the fixer is cleared, the one or more controllers provide a user with a notification that prompts the user to operate the adjuster for adjusting the pressure contact force to either the first pressure contact force or the second pressure contact force, such that the pressure contact force becomes appropriate based on a paper type of the paper sheet.

2. The image forming device according to claim 1, wherein after the paper jam is cleared and when a second job, accompanying a change, from the first job previously executed, in the paper type of the paper sheet, is registered, the one or more controllers provide the user with the notification.

3. The image forming device according to claim 2, wherein after the paper jam is cleared, and when the second job with the paper type changed from a regular paper to an envelope is registered, or when the second job with the paper type changed from the envelope to the regular paper is registered, the one or more controllers provide the user with the notification.

4. The image forming device according to claim 3, wherein when the second job with the paper type changed from the regular paper to the envelope is registered, the one or more controllers provide the notification indicating that the adjuster is to be operated to adjust the pressure contact force from the first pressure contact force to the second pressure contact force, and when the second job with the paper type changed from the envelope to the regular paper is registered, the one or more controllers provide the notification indicating that the adjuster is to be operated to adjust the pressure contact force from the second pressure contact force to the first pressure contact force.

5. The image forming device according to claim 1, wherein the one or more controllers suppress an operation to form, by the toner image former, the toner image while providing the user with the notification.

6. The image forming device according to claim 1, wherein the one or more controllers provide the user with the notification after providing a guiding method for clearing the paper jam.

7. The image forming device according to claim 1, wherein the one or more controllers suppress a warm-up operation of the toner image former while providing the user with the notification.

8. The image forming device according to claim 1, further comprising:

a display that displays the notification as a message screen, wherein the one or more controllers cancel display of the message screen through a screen operation by the user via the display.

9. The image forming device according to claim 1, wherein the one or more controllers display, to the user, operation guidance indicating different operation methods of the adjuster depending on whether the pressure contact force at the pressure contact portion is the first pressure contact force or the second pressure contact force.

10. The image forming device according to claim 1, wherein:

the one or more controllers display, on a display, a system setting screen that allows a user to set whether the notification is to be displayed, and the one or more controllers control whether the notification is displayed based on a user setting on the system setting screen.

11. The image forming device according to claim 10, wherein:

the one or more controllers display the system setting screen that further allows the user to independently set whether the notification is displayed after the paper jam is cleared and whether the notification is displayed when a second job involving a change in the paper type is registered, and the one or more controllers control display the notification based on user settings, including the user setting.

12. An image forming method comprising:

forming, on a paper sheet, a toner image based on image information;

fixing the toner image by nipping, at a pressure contact portion formed by a pair of rollers including a heating roller and a pressurizing roller, the paper sheet on which the toner image is formed; and executing a job related to image formation, wherein a pressure contact force applied at the pressure contact portion is adjusted to either a first pressure contact force or a second pressure contact force that is weaker than the first pressure contact force by operating an adjuster, and after a paper jam that has occurred in a vicinity of a fixer is cleared, a user is provided with a notification that prompts the user to operate the adjuster, such that the pressure contact force becomes appropriate based on a paper type of the paper sheet associated with a previously executed job.

* * * * *